US012182766B2

(12) United States Patent
Maiman et al.

(10) Patent No.: US 12,182,766 B2
(45) Date of Patent: Dec. 31, 2024

(54) GENERATING PARAMETERIZED RECORD FROM ELECTRONIC MESSAGES

(71) Applicant: Capital One Services, LLC, McLean, VA (US)

(72) Inventors: Tyler Maiman, Melville, NY (US); Jerry Wu, McLean, VA (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/325,965

(22) Filed: May 30, 2023

(65) Prior Publication Data

US 2024/0403832 A1    Dec. 5, 2024

(51) Int. Cl.
*G06Q 10/107* (2023.01)
*H04L 51/21* (2022.01)

(52) U.S. Cl.
CPC .......... *G06Q 10/107* (2013.01); *H04L 51/21* (2022.05)

(58) Field of Classification Search
CPC .............................. G06Q 10/107; H04L 51/21
See application file for complete search history.

(56) References Cited

U.S. PATENT DOCUMENTS

| 7,574,409 | B2* | 8/2009 | Patkin ............... | H04L 51/212 706/12 |
| 7,899,871 | B1* | 3/2011 | Kumar ............... | G06Q 10/107 709/206 |
| 10,102,478 | B2* | 10/2018 | Bouchard ........... | G06F 21/6263 |
| 10,909,450 | B2* | 2/2021 | Chen .................. | G06N 3/045 |
| 10,963,846 | B1* | 3/2021 | Cunliffe ............. | G06Q 20/12 |
| 2014/0280207 | A1* | 9/2014 | Renders ............. | G06F 16/24578 707/748 |
| 2018/0276134 | A1* | 9/2018 | Cherubini ........... | G06F 12/0862 |
| 2018/0337878 | A1* | 11/2018 | Sathi .................. | G06F 16/355 |
| 2019/0065033 | A1* | 2/2019 | Kulkarni ............ | H04L 51/42 |
| 2019/0244175 | A1* | 8/2019 | Ogrinz .............. | G06Q 10/063 |
| 2019/0295114 | A1* | 9/2019 | Pavletic ............. | G06F 18/214 |
| 2020/0356891 | A1* | 11/2020 | Saito ................. | G06N 5/045 |
| 2021/0234813 | A1* | 7/2021 | Narayan ............ | H04L 51/21 |

(Continued)

*Primary Examiner* — Blake J Rubin
(74) *Attorney, Agent, or Firm* — Foley & Lardner LLP

(57) ABSTRACT

Methods and systems are described herein for generating parameterized records using communications data. A generation system may be used to facilitate generating the parameterized records. The system may encode a plurality of electronic messages into bag-of-words embeddings and input a plurality of bag-of-words embeddings into a machine learning model to identify electronic messages containing itemized records, each including corresponding item identifiers. The system may transmit a request to identify server records associated with the itemized records, wherein the request comprises the corresponding item identifiers, and wherein the record identification server uses the corresponding item identifiers to identify the itemized records. The system may receive the server records each of which includes corresponding parameters. The system may, in response to determining that the corresponding parameters match sets of a plurality of sets of criteria, generate a parameterized record for the itemized records including the itemized records and corresponding parameter data.

20 Claims, 5 Drawing Sheets

(56) References Cited

U.S. PATENT DOCUMENTS

2023/0153878 A1* 5/2023 Glaser ............... G06Q 30/0637
  705/26.25
2024/0062021 A1* 2/2024 Tangari ............... G06F 16/2433

* cited by examiner

GENERATING PARAMETERIZED RECORD FROM ELECTRONIC MESSAGES

BACKGROUND

Electronic communications such as email, text messages, and others have become ubiquitous in our society. People use email, for example, to communicate in a variety of ways. The simplest use of electronic communications involves sending messages. However, other uses of email have become prevalent. For example, various information may be sent (e.g., in the form of an attachment). These attachments may include images, documents, and/or other information types. Another way people use email is for communicating various reminders, appointments, or other types of data that needs a confirmation. These communications may be sent by online scheduling systems.

SUMMARY

Warehouses are an essential part of the supply chain of many entities. However, there are many problems that affect the efficiency and profitability of warehouses. In particular, inaccuracy of tracking and incomplete or insufficient documentation of parts that have been shipped out for users (e.g., customers, recipients, etc.) can cause significant problems for intended recipients that rely on these components for their operations. For example, if an intended recipient receives a shipment of parts without proper documentation, they may face challenges in understanding the components' characteristics and applications, which can impede their capacity to integrate the parts effectively into their operations.

This can result in delays to production, additional costs associated with troubleshooting and reordering, and may damage relationships between the warehouse and recipients of goods shipped from the warehouse. In addition to these concerns, inaccurate tracking and incomplete documentation can also have legal and compliance implications for warehouses and their clients. For example, if a warehouse is unable to provide accurate records of shipped parts, it may be liable for damages resulting from defects or other quality control issues.

Incomplete documentation can also lead to difficulties in complying with regulatory requirements, such as those related to product safety, labeling, and traceability. For example, if a warehouse needs to recall a product due to FDA safety concerns, it is important to be able to identify specific attributes and information quickly and efficiently. Accordingly, a mechanism is desired that would enable warehouses and clients to accurately and efficiently generate information regarding parts and components for recipients, without the need for multiple interactions with the warehouse and/or client to procure specific information.

One mechanism to enable users to generate information regarding components includes generating parameterized records using communications data. Communications data such as emails, texts, etc. containing itemized records (e.g., shipment records) can be used to identify one or more server records which include parameters about the items. The information in the server records and itemized records can be compiled to generate a parameterized record, e.g., to provide documentation regarding components shipped to a client. Therefore, methods and systems are described herein for generating parameterized records using communications data. A generation system may be used to perform operations described herein.

The generation system may encode a plurality of electronic messages into a plurality of bag-of-words embeddings. For example, the generation system may obtain a plurality of electronic messages such as emails, texts, etc., some of which may include information regarding shipments from a warehouse. The generation system may take content, such as text, from the electronic messages and encode the content using bag-of-words embeddings, such as a data structure including words from the electronic message as a multiset of words, disregarding grammar and word order, but keeping track of frequencies.

The generation system may input the plurality of bag-of-words embeddings into a machine learning model, e.g., to identify electronic messages containing one or more itemized records. For example, an itemized record may include a list of individual items identified by item identifiers (e.g., Stock Keeping Unit (SKU)) along with accompanying details, such as an invoice, receipt, purchase order, inventory record, etc. The machine learning model may be trained to identify bag-of-words embeddings containing one or more itemized records.

The generation system may transmit a request to identify server records associated with the one or more itemized records. For example, the system may transmit the request to a record identification server, and the request may include the item identifiers. The record identification server may use the item identifier to identify the one or more server records. For example, electronic messages such as emails or text messages may include an itemized record of components, like a receipt, which identify components using item identifiers such as SKU values. The system may transmit a request to find server records associated with the components, e.g., using the SKU values.

The generation system may receive, from the record identification server, the one or more server records. Each server record of the one or more server records may include corresponding parameters. The server records may include more information regarding the components specific to the shipping, the component, and/or the like. The generation system may generate a parameterized record for the one or more itemized records, e.g., in response to determining that parameters of the server records match one or more sets of a plurality of sets of criteria. For example, in response to determining that the server records indicate that the components were ordered in a particular time frame, the system may generate a parameterized record. As described herein, based on a user's order for components, the system may generate a parameterized record that compiles information from server records and itemized records provided in electronic communications.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
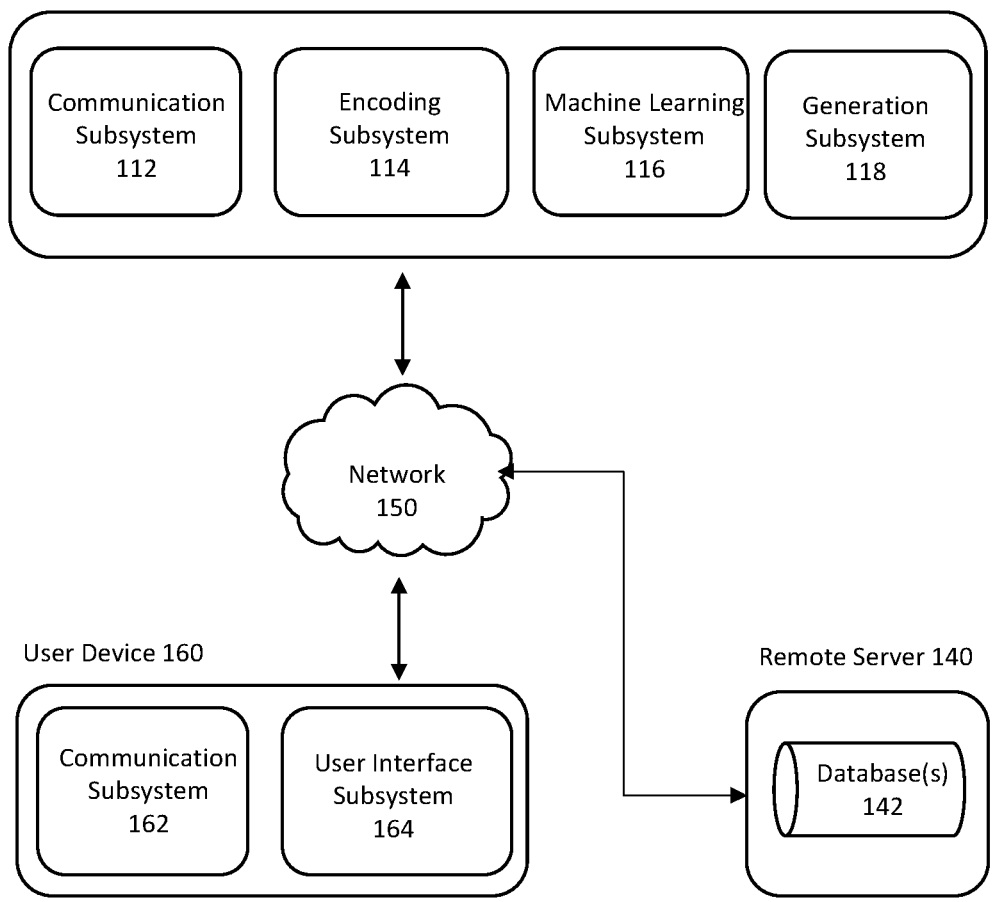
FIG. 1 shows an illustrative diagram for generating parameterized records using communications data, in accordance with one or more embodiments.

FIG. 1 is an example of environment 100 for generating parameterized records. For example, environment 100 may be used to generate parameterized records using communications data. Environment 100 includes generation system 110, user device 160, and remote server 140. Generation system 110, user device 160, and remote server 140 may be in communication via the network 150. Network 150 may be a wired and/or wireless connection such as via a local area network, a wide area network (e.g., the Internet), or a combination thereof.

Generation system 110 may execute instructions for generating parameterized records to enable warehouses and clients to accurately and efficiently retrieve information regarding parts and components for recipients, without the need for multiple interactions with the warehouse and/or client to procure specific information. Generation system 110 may include software, hardware, or a combination of the two. For example, generation system 110 may be hosted on a physical server or a virtual server that is running on a physical computer system. In some embodiments, generation system 110 may be configured on user device 160 (e.g., a laptop computer, a smartphone, a desktop computer, an electronic tablet, or another user device 160). In some examples, the generation system 110 may include a plug-in and may be stored locally. Generation system 110 may access remote servers, such as remote server 140 via network 150.

Generation system 110 may include components such as communication subsystem 112, encoding subsystem 114, machine learning subsystem 116, and generation subsystem 118, which may be used to generate parameterized records. In some embodiments, generation system 110 may receive a plurality of electronic messages using communication subsystem 112.

Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive electronic messages such as emails, text messages, etc. of a user. Communication subsystem 112 may pass at least a portion of the data included in the electronic messages, or a pointer to the data in memory, to other subsystems such as encoding subsystem 114, machine learning subsystem 116 and/or generation subsystem 118. Communication subsystem 112 may receive the electronic messages, e.g., via network 150, from a remote server 140, and/or a database 142 of remote server 140.

Techniques disclosed herein may be used to generate parameterized records such as an expense report using email data, such as data of emails containing receipts. For example, emails of a user may be encoded into embeddings (e.g., a vector generated based on the text of the emails) and input into a machine learning model trained to identify embeddings. Based on the receipt, the system may transmit a request to the remote server to identify server records regarding the items from the receipt. For example, based on item identifiers like SKU values, the server may identify further information regarding the item and/or a transfer associated with the item. In one example, the server may identify metadata associated with the purchase of the item. The system may receive the server records which have corresponding parameters such as location of purchase, etc. If the parameters meet criteria, a parameterized record such as an expense report may be generated. Described herein are methods and descriptions for performing processing of emails to generate expense reports. In other examples, techniques disclosed herein may be used to process other electronic messages to generate other parameterized records as described herein.

Encoding subsystem 114 may be used to encode a plurality of electronic messages into a plurality of bag-of-words embedding. For example, the encoding subsystem may obtain text from a plurality of electronic messages. In some examples, the encoding subsystem 114 may extract text from electronic messages, and/or perform optical character recognition on images provided within the electronic messages. Encoding subsystem 114 may perform bag-of-words encoding to obtain a bag-of-words embedding corresponding to each electronic message.

Performing bag-of-words encoding may include representing text data numerically, e.g., by representing a text document, or a text string, as a multiset of its words, disregarding grammar and word order, but keeping track of their frequencies. The process of performing bag-of-words encodings may include tokenization, vocabulary creation, and encoding. For example, the text may be split into individual words or tokens during tokenization (e.g., separated by whitespace, punctuation, etc.). During vocabulary creation, the encoding subsystem 114 may generate a unique vocabulary of words created from the tokens in the document corpus. The vocabulary may serve as a fixed set of features for representing the documents. The encoding subsystem 114 may also perform encoding by representing the text as a vector. The vector may be of the same size as the vocabulary, and the values of the vector may represent the frequency of the word in the document.

As a result of encoding a plurality of electronic messages into a plurality of bag-of-words embeddings, the encoding subsystem 114 may output and/or pass the bag-of-word embeddings. In some examples, the bag-of-word embeddings may include vectors representing a frequency of each word in the generated vocabulary.

Machine learning subsystem 116 may be used to determine whether the electronic messages include authorization packages which enable individual users to procure resources. Machine learning subsystem 116 may include software, hardware, or a combination of the two. For example, machine learning subsystem 116 may be a physical server, or a virtual server that is running on a physical computer system. In some embodiments, generation system 110 and machine learning subsystem 116 may reside on the same hardware and/or the same virtual server/computing device.

The machine learning subsystem 116 may include one or more machine learning models trained to identify electronic messages containing one or more itemized records (e.g., purchase records, receipts, invoices, etc.). As referred to herein, an itemized record may include a detailed list or account of individual items, goods or services along with respective attributes, such as prices, quantities, and/or other relevant details. An itemized record may include for example, an invoice, a receipt, a purchase history, etc. Each itemized record may include corresponding item identifiers, identifying the specific item. Generation system 110 may input the plurality of bag-of-words embeddings, e.g., passed from encoding subsystem 114, into one or more machine learning models of machine learning subsystem 116 to identify one or more electronic messages containing one or more itemized records.

The machine learning subsystem 116 may pass the identified one or more electronic messages, and/or identifiers for the electronic messages to other subsystems such as communication subsystem 112, and/or generation subsystem 118. The communication subsystem 112 may transmit a request to identify one or more server records associated with the one or more itemized records, e.g., to a record identification server. For example, once the machine learning subsystem 116 identifies electronic messages containing one or more itemized records containing item identifiers (e.g., component identifiers), the generation system 110 may retrieve information from records on a remote server associated with the items, so that the information may be used with information from the itemized record to generate a parameterized record. The record identification server may be remote server 140, and may use the corresponding item identifiers to identify the one or more server records. For example, the generation system may identify a SKU value for an item identified on an invoice sent via email. The generation system may then request server records on the item having the SKU value, and subsequently use the server records with the information from the invoice to generate a parameterized record.

In some examples, the record identification server (e.g., remote server 140) may transmit back the one or more server records, e.g., via network 150. Generation system 110 may receive (e.g., via the communication subsystem 112), from the record identification server, the one or more server records. Each server record of the one or more itemized records may include corresponding parameters. For example, while the itemized record may be an invoice including information such as cost and quantity of an item (e.g., component) purchased, the server records may include specification information for the item, such as size, batch number, etc.

In some examples, the record identification server may be unable to identify server records associated with the one or more itemized records. The generation system 110 may receive, e.g., via the communication subsystem 112 from the record identification server, an indication that no record matches the itemized record(s). The generation system may transmit, e.g., to a user device 160, a second request for obtaining item data associated with the first itemized record of the one or more itemized records. The second request may include a plurality of data fields to be filled in by a user.

Generation subsystem 118 may be used to generate the parameterized record for one or more itemized records. The parameterized record may include one or more items from the itemized records (e.g., from electronic communications) and a value for fields corresponding to each component. Generation subsystem 118 may include software, hardware, or a combination of the two. For example, generation subsystem 118 may be a physical server, or a virtual server that is running on a physical computer system. In some embodiments, one or more of communication subsystem 112, encoding subsystem 114, machine learning subsystem 116 and generation subsystem 118 may reside on the same hardware and/or the same virtual server/computing device.

Figure 2A:
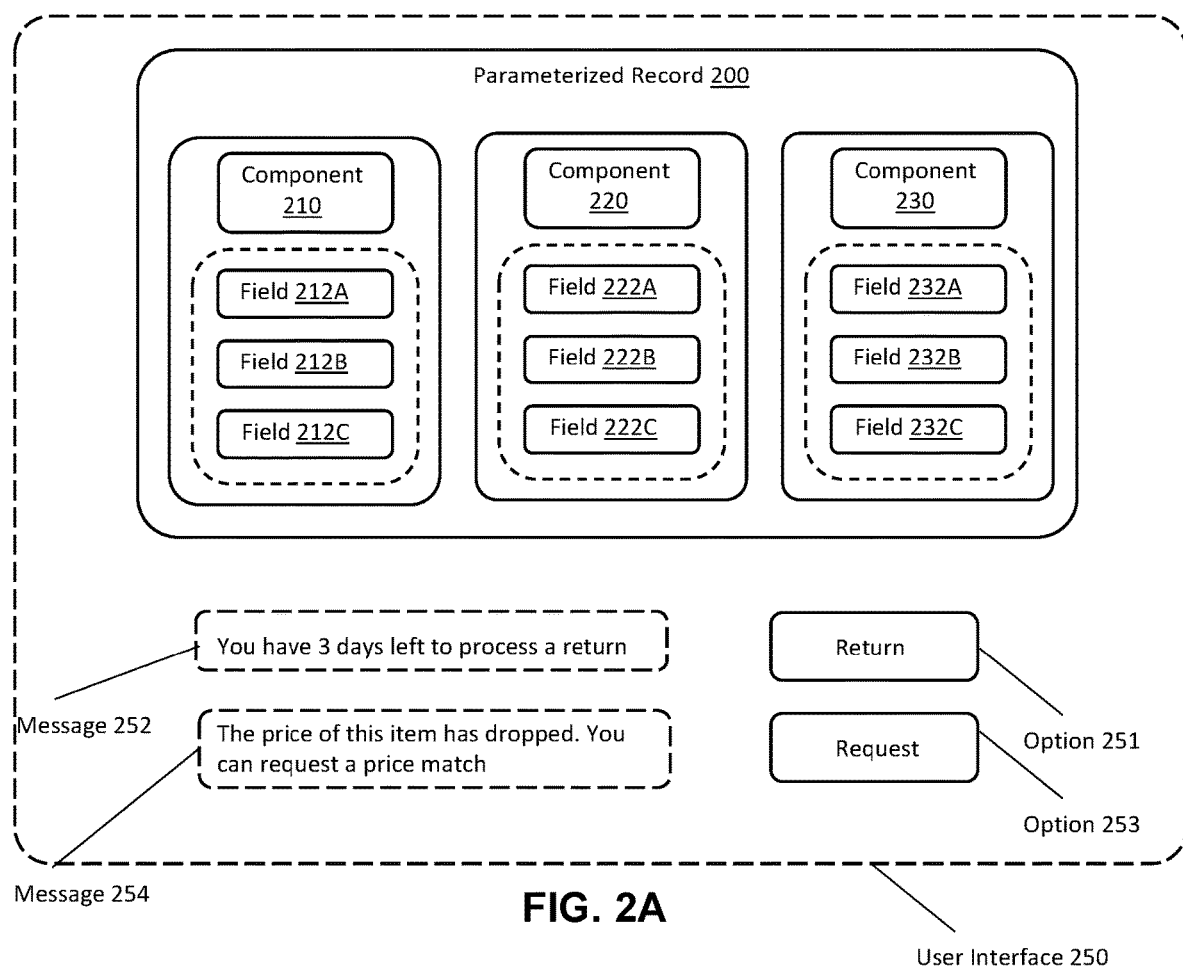
FIG. 2A shows an illustrative diagram of a user interface, e.g., through which user input is received, in accordance with one or more embodiments.

Generation subsystem 118 may generate a parameterized record for the one or more itemized records, e.g., in response to determining that the corresponding parameters match one or more sets of a plurality of sets of criteria. For example, FIG. 2A shows an example parameterized record 200 displayed in a user interface 250 (e.g., of a user device 160), according to some embodiments. In some examples, the parameterized record 200 includes the one or more itemized records and the corresponding parameter data from the one or more server records. In the example of FIG. 2A, the parameterized record 200 may identify components (e.g., items) such as component 210, component 220, and component 230. Each of the components may have values for fields. In some examples, the values may be specific to the component, such as cost, size, etc. In some examples, the values may be indicative of a transfer or order instead, such as purchase date, authentication card (e.g., credit card) used for purchase, etc. In FIG. 2A, fields 212A-C may include values for component 210 that provide further information regarding component 210. Similarly, component 220 may have values for fields 222A-C and component 230 may have values for fields 232A-C that each provide further information regarding the components.

Generation subsystem 118 may generate the parameterized record 200 by retrieving a plurality of parameterized record field identifiers. Parameterized record field identifiers may identify names of the fields for the parameterized records. For example, the parameterized record field identifiers may include data such as cost, quantity, size, etc. of the components. The parameterized record field identifiers may include fields that should have values in the parameterized record 200.

Generation subsystem 118 may retrieve the values for the fields from the server records, the itemized records, and/or both. For example, the generation subsystem 118 may retrieve values for a first portion of the parameterized record field identifiers from the one or more itemized records. In response to determining that values for a second portion of the parameterized record field identifiers are not in the one or more itemized records, generation subsystem 118 may retrieve values for the second portion of the plurality of parameterized record field identifiers from the one or more server records. Generation subsystem 118 may incorporate the retrieved values for the field identifiers into the parameterized record. For example, generation subsystem 118 may insert, into the parameterized record, the values of the first portion and second portion of the plurality of parameterized record field identifiers, e.g., from the itemized records and server records respectively.

As described herein, in some cases, there may be no server records associated with the itemized record(s) to be retrieved from the remote server. In this case, rather than retrieving the values for the field identifiers from the server records, the system may obtain them from user input. For example, the system may receive from the user device 160, e.g., via network 150 and communication subsystem 162 and communication subsystem 112, item data associated with the first itemized record of the one or more itemized records. For example, the user may be prompted via user interface subsystem 164 for the item data. The system may add the first itemized record and the item data to the parameterized record, e.g., based on the item data matching a set of the plurality of sets of criteria.

As described herein, according to some examples, the parameterized record may be generated in response to determining that the corresponding parameters match one or more sets of a plurality of sets of criteria. The determination may include selecting a first set of criteria of the plurality of sets of criteria. The first set of criteria may include a plurality of fields with a plurality of corresponding threshold values for evaluating a record. For example, the generation system 110 may be configured to generate a record if parameters of the components match one or more criteria, for example, if the items were purchased at a first location, or during a specific time period. The system may determine a first subset of fields having values stored in the one or more itemized records and a second subset of fields having values stored in the one or more server records. The system may retrieve the values of the first subset of fields from the one or more itemized records and values of the second subset of fields from the one or more server records and comparing the values to the plurality of corresponding threshold values to evaluate a record of the one or more itemized records.

As described herein, FIG. 2A shows an example parameterized record 200 displayed in a user interface 250, according to some embodiments. The user interface 250 may also display one or more options (e.g., "return" option 251, and "request" option 253) for a user to select to perform related to the itemized records. For example, if the itemized record is an invoice or a receipt for a purchase, the warehouse or entity that provided the purchased item may have a return policy. In some examples, certain items have a no return policy while certain items do. Based on parameters such as how much time has elapsed, the system may determine if a return is still possible and/or present an option to do so. For example, the generation system 110 may receive, from the record identification server, (1) the one or more server records associated with the one or more itemized records and (2) the corresponding parameters associated with the one or more server records. For each server record, the system may determine one or more mutable parameters of the corresponding parameters. For example, the one or more mutable parameters may include time elapsed since the itemized record was generated or transmitted in the electronic message, an item price (e.g., item prices may fluctuate, and the item seller may have a price match policy), etc.

Based on at least one value of the one or more mutable parameters, the system may generate a message for a user, wherein the message causes a user device to display a prompt to perform an action related to an itemized record of the one or more itemized records and may transmit the message to the user device. For example, if the time elapsed since the itemized record is above or close to a threshold time elapsed for when a user may process a return, the user interface 250 may indicate the remaining time as a message 252, "You have 3 days left to process a return" and present the option to return as option 251. As another example, if the price of the item as indicated on the server record shows a significant drop from when a user purchased the item, the system may transmit a message 254 to the user device "The price of this item has dropped. You can request a price match" as well as an option 253 to request a price match.

The user may select one or more options on the user interface. The system may receive from the user via a user interface, an input for performing the action. The system may transmit, to a remote server, a command for performing the action. In response to receiving an indication of a successful performance of the action, the system may modify at least one value of the one or more mutable parameters.

According to some examples, the system may determine, based on the one or more mutable parameters, a value for a period of time during which the user is allowed to perform the action associated with the one or more server records and in response to determining that the value of the period of time is less than a first threshold period of time, generate one or more instructions for performing the action during the period of time. For example, if a price change has been noted to decrease and a price match can be requested and the period of time for doing so is close to elapsing, the system may automatically perform the price match request.

According to some examples, the generation system may transmit (e.g., via communication subsystem 112), to remote server 140, a request for generating a component inventory, wherein the request comprises the parameterized record. The generation system 110 may receive (e.g., via network 150 and/or communication subsystem 112), from the remote server 140, a data file representing the component inventory. The system may generate for display on a user interface 270 (e.g., a user interface connected to generation system 110 or the user interface of user device 160), (1) the data file and (2) a request for approving the data file.

Figure 2B:
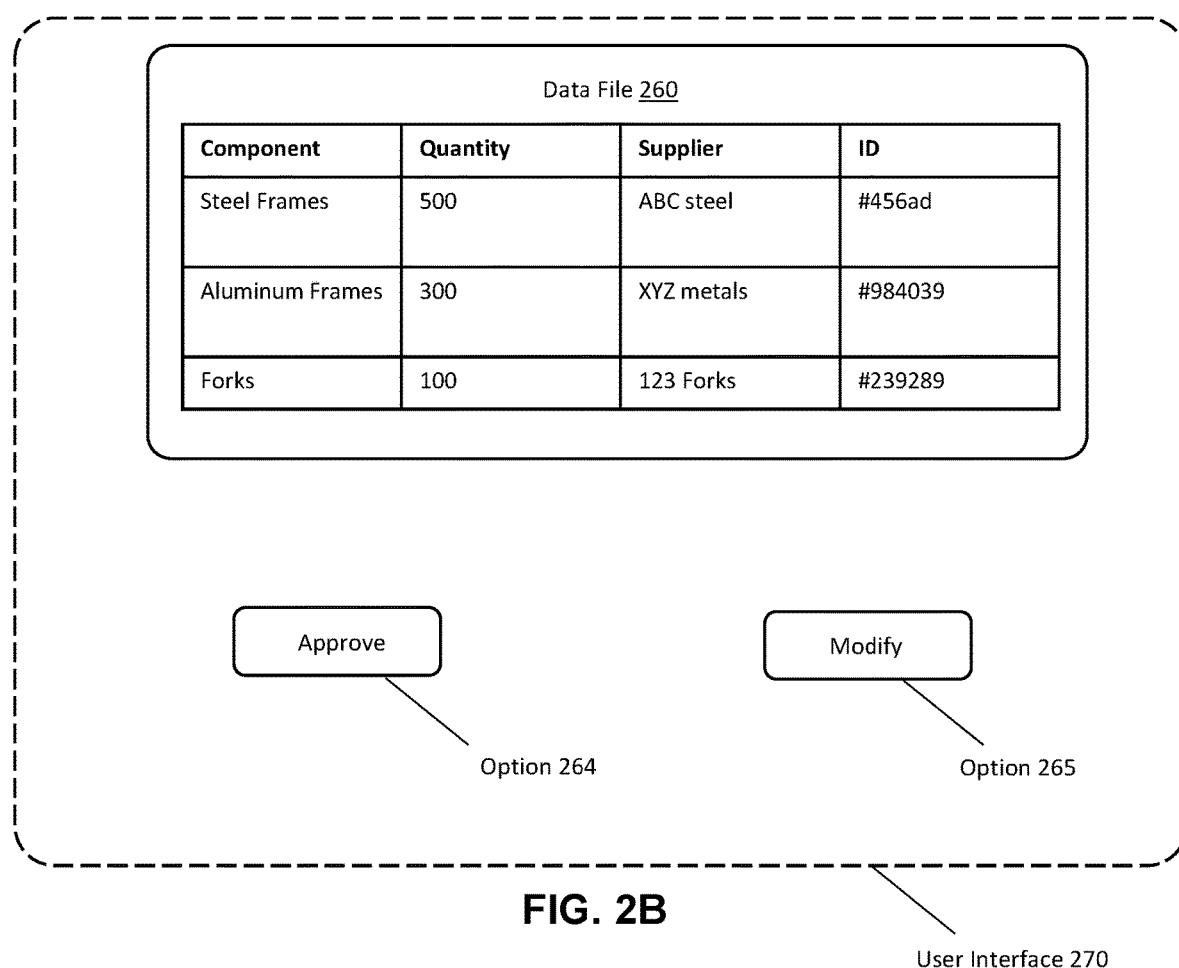
FIG. 2B shows an illustrative diagram of a user interface through which a user may view a data file associated with the generated parameterized record, in accordance with one or more embodiments.

For example, FIG. 2B shows an illustrative diagram of a user interface through which a user may view a data file 260 associated with the generated parameterized record, in accordance with one or more embodiments. The user interface 270 may also present options for the user, such as option 264 for approving the data file, or option 265 for modifying the data file. The system may receive, via the user interface, an indication of approval for the data file and transmit, to the remote server 140, a notification of approval. Alternatively, and/or additionally, the system may receive, via the user interface, an indication that the data file is not approved and generate for display on the user interface, (1) the data file and (2) one or more options for modifying the data file. The user may make selections for editing the data file. For example, the system may receive, via the user interface, one or more selections for modifying the data file. Using network 150, the system may transmit, to a remote server, a request to modify the data file based on the one or more selections and receive, from the remote server, a modified data file; and generate for display on a user interface, (1) the modified data file and (2) a request for approving the data file.

Figure 3:
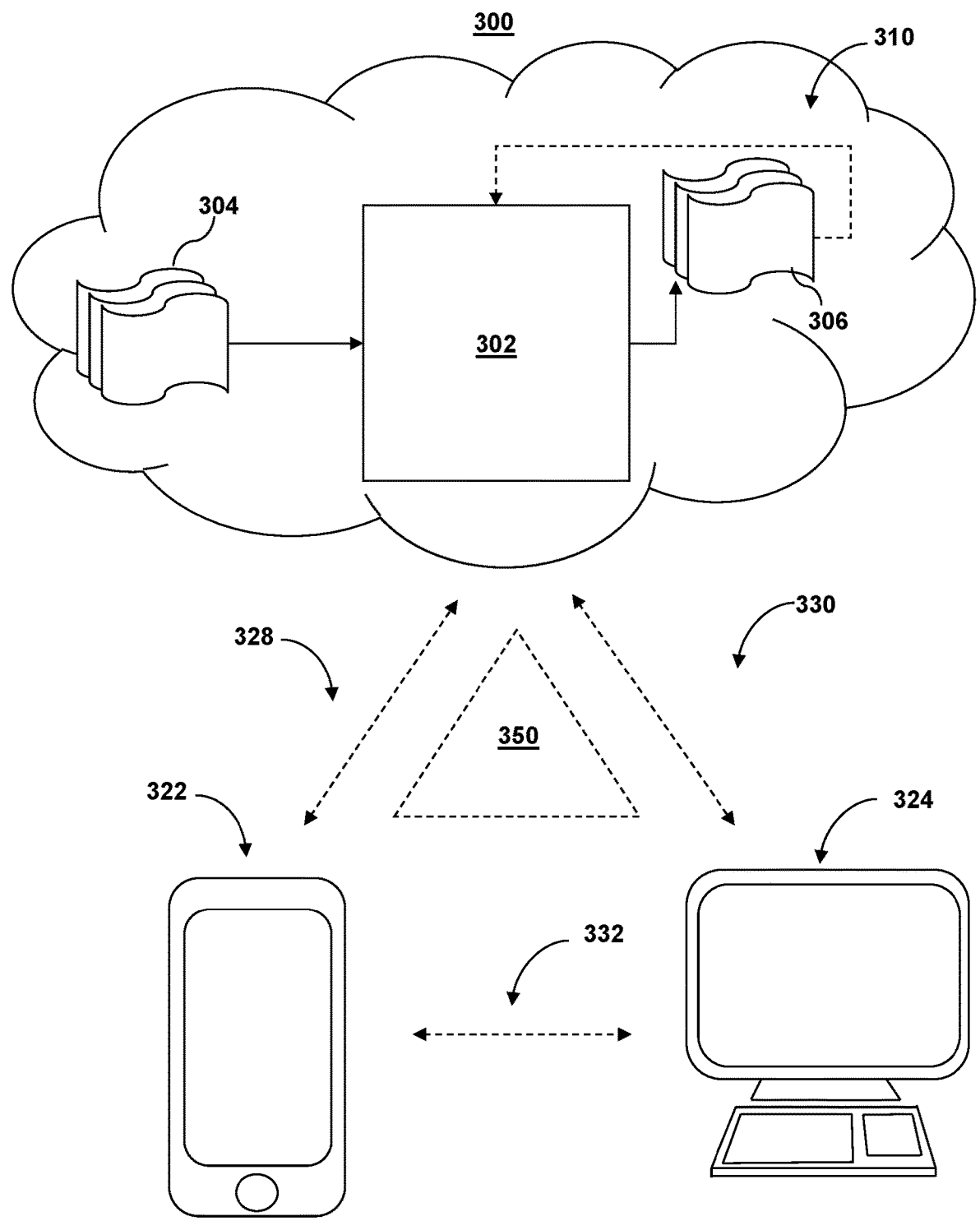
FIG. 3 shows illustrative components for a system used to generate parameterized records, in accordance with one or more embodiments.

FIG. 3 shows illustrative components for a system used to identify bag-of-words embeddings containing one or more itemized records, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300.

It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include and/or be used to access one or more of generation system 110, user device 160, network 150, and/or remote server 140.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train the model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether a bag-of-words embeddings contains one or more itemized records).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., to identify bag-of-words embeddings containing one or more itemized records).

In some embodiments, the model (e.g., model 302) may automatically perform actions based on outputs 306. In some embodiments, the model (e.g., model 302) may not perform any actions. The output of the model (e.g., model 302) may be used to identify bag-of-words embeddings containing one or more itemized records.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web service APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

According to some examples, the mobile device 322 and/or user terminal 324 may host the generation system 110 thereon. Additionally, or alternatively, the generation system 110 may be hosted on cloud components such as cloud components 310. In some examples, the generation system 110 may obtain electronic messages such as emails, e.g., stored in the mobile device 322 and/or user terminal 324. Alternatively and/or additionally, the generation system 110 may obtain the emails using cloud components. In some examples, generation system 110 may obtain the electronic messages and perform encoding to obtain embeddings as described herein on the mobile device 322 and/or user terminal 324. The system may input the embeddings to a local machine learning model. Alternatively or additionally, the electronic messages may be input into model 302, which may be hosted and executed on cloud components. The model 302 may determine embeddings containing itemized records. For example, the output 306 of the model 302 may be a probability that embeddings include itemized records, and/or may simply be a determination that embeddings contain itemized records. The command for executing an operation, such as describe herein, may be transmitted via the API layer 350.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
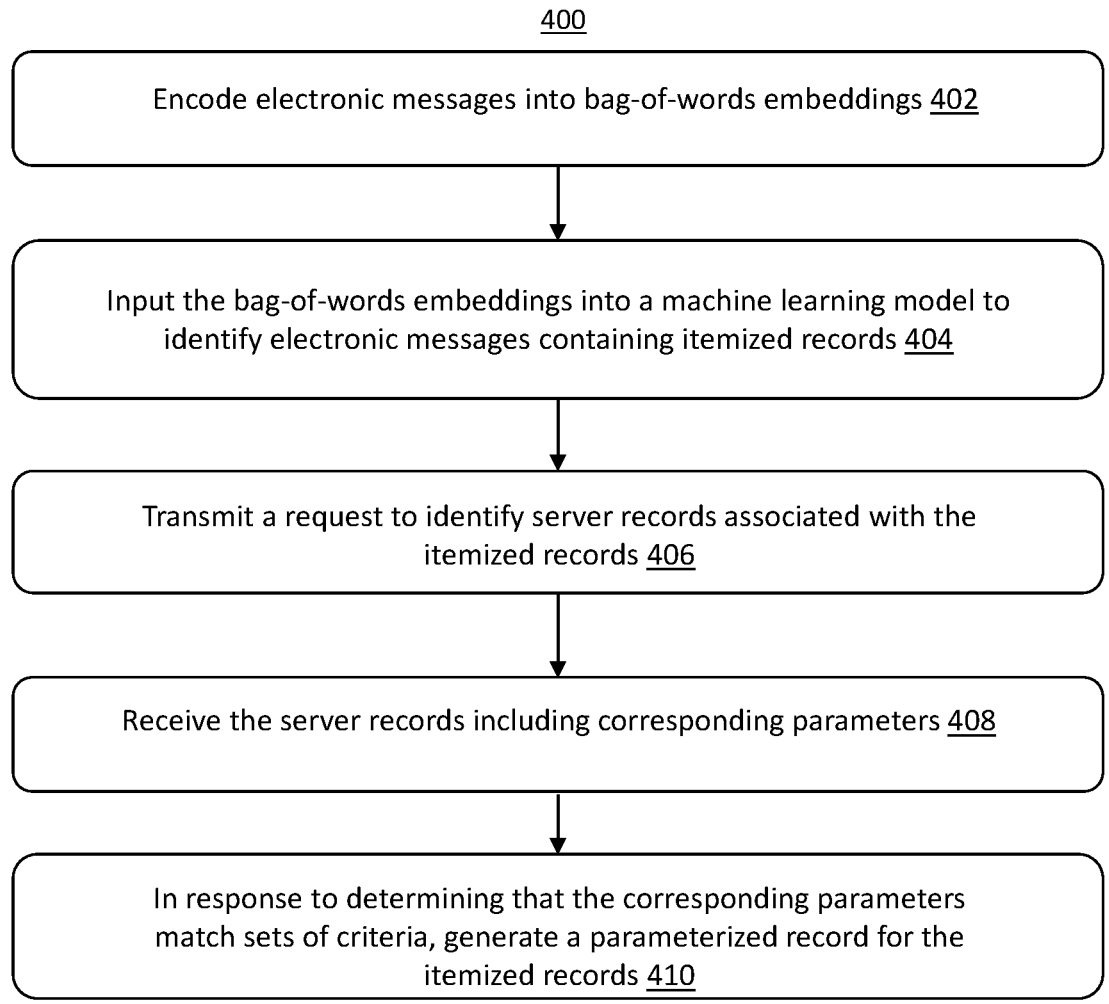
FIG. 4 shows a flowchart of the steps involved for generating parameterized records using communications data, in accordance with one or more embodiments.

FIG. 4 shows a flowchart of the steps involved in a process 400 for processing electronic messages, in accordance with one or more embodiments. For example, the system may use process 400 (e.g., as implemented on one or more system components described above) in order to process electronic messages. The operations of FIG. 4 may use components described in relation to FIG. 3. In some embodiments, generation system 110 may include one or more components of system 300 and may be used to perform the steps of process 400. For example, the model 302 may be incorporated into the machine learning subsystem 116.

At step 402, generation system 110 encodes electronic messages into bag-of-words embeddings. For example, generation system 110 may obtain (e.g., via the communication subsystem and/or network) a plurality of electronic messages and encode the plurality of electronic messages into a plurality of bag-of-words embeddings.

For example, the generation system 110 may receive electronic emails via the communication subsystem 112 and network 150, e.g., from a user device such as mobile device 322, remote server 140, database 142, and/or the like. The encoding subsystem 114 may obtain text from a plurality of electronic messages and/or may extract text from electronic messages, (e.g., perform optical character recognition on images provided within the electronic messages). Encoding subsystem 114 may perform bag-of-words encoding to obtain a bag-of-words embedding corresponding to each electronic message.

For example, the generation system 110 may receive emails of a user, where one or more of the emails may include an itemized record, such as a receipt for item purchases of a user. Encoding subsystem 114 may generate a bag-of-words embedding using the text of the electronic message. When encoding subsystem 114 performs encoding on the emails, the resulting bag-of-words embedding may be a vector where each index of the vector represents a specific word in the bag-of-words vocabulary, and the value represents a frequency of the word in the email.

At step 404, generation system 110 inputs the bag-of-words embeddings into a machine learning model to identify electronic messages containing itemized records. For example, the generation system may input the plurality of bag-of-words embeddings into a machine learning model to identify one or more electronic messages containing one or more itemized records. In some examples, an itemized record of the one or more itemized records includes corresponding item identifiers. The machine learning model may be trained to identify bag-of-words embeddings containing one or more itemized records.

For example, emails containing receipts may have certain words or symbols commonly present, such as "$", "receipt", "order", "address", "items", "price", "qty", "paid" and/or "cost." The machine learning model may be trained to identify, based on the presence and or frequency of such words, that an email includes a receipt. Generation system 110 may input the embeddings from encoding subsystem 114 into machine learning subsystem 116 to make a determination as to which emails corresponding to the input embeddings have receipts.

At step 406, generation system 110 transmits a request to identify server records associated with the itemized records. For example, generation system 110 may transmit, e.g., via communication subsystem 112 and network 150, to a record identification server such as remote server 140, a request to identify one or more server records associated with the one or more itemized records. In some examples, the request comprises the corresponding item identifiers. In some examples, the record identification server uses the corresponding item identifiers to identify the one or more server records.

For example, in order to find more information regarding items from the itemized record, e.g., more information regarding purchased items listed in the receipt, generation system 110 may transmit information identifying the items (e.g., item identifier) along with other information (e.g., user identification, supplier information, etc.) as part of a request for records on a remote server. For example, generation system 110 may transmit the SKU value to a remote server 140 and/or database 142, where the remote server 140 and/or database 142 may use the SKU value to identify further information regarding the item such as its color, style, brand, type, size, price and/or the like. Remote server 140, and/or database 142 may find the server records that correspond to the item and send it to generation system 110 via network 150.

At step 408, generation system 110 receives the server records, e.g., via communication subsystem 112 and/or network 150. For example, the generation system 110 may receive the server records from the record identification server, such as remote server 140. In some examples, each server record of the one or more itemized records comprises corresponding parameters.

At step 410, generation system 110 may, in response to determining that the corresponding parameters match the set(s) of criteria, generate a parameterized record for the itemized records. For example, the generation system 110 may generate a parameterized record in response to determining that the corresponding parameters match one or more sets of a plurality of sets of criteria. In some examples, the parameterized record includes the one or more itemized records and corresponding parameter data. For example, determining that the corresponding parameters match the set(s) of criteria may include determining that the item records, e.g., receipts correspond to purchases made during a business trip. For example, the corresponding parameters may be a time and location of the purchase, and the generated parameterized record may be a generated expense report for exportation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating parameterized records using communications data, the method comprising: encoding a plurality of electronic messages into a plurality of bag-of-words embeddings; inputting the plurality of bag-of-words embeddings into a machine learning model to identify one or more electronic messages containing one or more itemized records, wherein the machine learning model is trained to identify bag-of-words embeddings containing one or more itemized records, and wherein each itemized record of the one or more itemized records comprises corresponding item identifiers; transmitting, to a record identification server, a request to identify one or more server records associated with the one or more itemized records, wherein the request comprises the corresponding item identifiers, and wherein the record identification server uses the corresponding item identifiers to identify the one or more server records; receiving, from the record identification server, the one or more server records, wherein each server record of the one or more server records comprises corresponding parameters; and in response to determining that the corresponding parameters match one or more sets of a plurality of sets of criteria, generating a parameterized record for the one or more itemized records, wherein the parameterized record comprises the one or more itemized records and corresponding parameter data.

2. The method of any of the preceding embodiments, wherein generating the parameterized record comprises: retrieving a plurality of parameterized record field identifiers; retrieving values for a first portion of the plurality of parameterized record field identifiers from the one or more itemized records; in response to determining that values for a second portion of the plurality of parameterized record field identifiers are not in the one or more itemized records, retrieving values for the second portion of the plurality of parameterized record field identifiers from the one or more server records; and inserting, into the parameterized record, the values of the first portion and second portion of the plurality of parameterized record field identifiers.

3. The method of any of the preceding embodiments, further comprising: receiving, from a remote server, an indication that no record matches a first itemized record of the one or more itemized records; and transmitting, to a user device, a second request for obtaining item data associated with the first itemized record of the one or more itemized records, wherein the second request comprises a plurality of data fields to be filled in by a user.

4. The method of any of the preceding embodiments, further comprising: receiving, from the user device, the item data associated with the first itemized record of the one or more itemized records; and based on the item data matching a set of the plurality of sets of criteria, adding the first itemized record and the item data to the parameterized record.

5. The method of any of the preceding embodiments, wherein determining that the corresponding parameters match one or more sets of a plurality of sets of criteria comprises: selecting a first set of criteria of the plurality of sets of criteria, wherein the first set of criteria comprises a plurality of fields with a plurality of corresponding threshold values for evaluating a record; determining a first subset of fields having values stored in the one or more itemized records and a second subset of fields having values stored in the one or more server records; retrieving the values of the first subset of fields from the one or more itemized records and values of the second subset of fields from the one or more server records; and comparing the values to the plurality of corresponding threshold values to evaluate a record of the one or more itemized records.

6. The method of any of the preceding embodiments, further comprising: receiving, from the record identification server, (1) the one or more server records associated with the one or more itemized records and (2) the corresponding parameters associated with the one or more server records; determining, for each record of the one or more server records, one or more mutable parameters of the corresponding parameters; generating, based on at least one value of the one or more mutable parameters, a message for a user, wherein the message causes a user device to display a prompt to perform an action related to an itemized record of the one or more itemized records; and transmitting the message to the user device.

7. The method of any of the preceding embodiments, wherein the method further comprises: determining, based on the one or more mutable parameters, a value for a period of time during which the user is allowed to perform the action associated with the one or more server records; and in response to determining that the value of the period of time is less than a first threshold period of time, generating one or more instructions for performing the action during the period of time.

8. The method of any of the preceding embodiments, further comprising: receiving, from the user via a user interface, an input for performing the action; transmitting, to a remote server, a command for performing the action; and in response to receiving an indication of a successful performance of the action, modifying at least one value of the one or more mutable parameters.

9. The method of any of the preceding embodiments, further comprising: transmitting, to a remote server, a request for generating a component inventory, wherein the request comprises the parameterized record; receiving, from the remote server, a data file representing the component inventory; and generating for display on a user interface, (1) the data file and (2) a request for approving the data file.

10. The method of any of the preceding embodiments, further comprising: receiving, via the user interface, an indication of approval for the data file; and transmitting, to the remote server, a notification of approval.

11. The method of any of the preceding embodiments, further comprising: receiving, via the user interface, an indication that the data file is not approved; and generating for display on the user interface, (1) the data file and (2) one or more options for modifying the data file.

12. The method of any of the preceding embodiments, further comprising: receiving, via the user interface, one or more selections for modifying the data file; transmitting, to a remote server, a request to modify the data file based on the one or more selections; receiving, from the remote server, a modified data file; and generating for display on a user interface, (1) the modified data file and (2) a request for approving the data file.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the one or more processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:
1. A system for generating parameterized records using electronic message data, the system comprising:
one or more processors; and
a non-transitory, computer-readable storage medium storing instructions that when executed by the one or more processors cause the one or more processors to perform operations comprising:
receiving, a plurality of electronic messages associated with a user;
encoding the plurality of electronic messages into a plurality of bag-of-words embeddings;
inputting the plurality of bag-of-words embeddings into a machine learning model to identify one or more electronic messages containing one or more purchase records, wherein the machine learning model is trained to identify bag-of-words embeddings containing one or more purchase records, and wherein each purchase record of the one or more purchase records comprises corresponding purchased item identifiers;
transmitting, to a record identification server, a request to identify one or more server records associated with the one or more purchase records, wherein the request comprises the corresponding item identifiers, wherein the record identification server uses the corresponding item identifiers to identify the one or more server records, and wherein each server record corresponds to a transfer of a purchased item associated with an item identifier;

receiving, from the record identification server, the one or more server records, wherein each server record of the one or more server records comprises corresponding parameters that correspond to a respective purchase record of a respective purchased item;

comparing, for each server record of the one or more server records, the corresponding parameters with a plurality of sets of criteria;

in response to determining that the corresponding parameters match one or more sets of the plurality of sets of criteria, generating a parameterized transaction record for the one or more server records, wherein the parameterized transaction record comprises the one or more purchase records and corresponding parameter data; and transmitting the parameterized transaction record to a remote server.

2. The system of claim 1, wherein the instructions cause the one or more processors to perform operations comprising:

receiving, from the remote server, an indication that no server record matches a first purchase record of the one or more purchase records;

transmitting, to a user device, a second request for obtaining item data associated with the first purchase record of the one or more purchase records, wherein the second request comprises a plurality of data fields to be filled in by the user;

receiving, from the user device, the item data associated with the first purchase record of the one or more purchase records; and based on the item data matching a set of the plurality of sets of criteria, adding the first purchase record and the item data to the parameterized transaction record.

3. A method for generating parameterized records using communications data, the method comprising:

encoding a plurality of electronic messages into a plurality of bag-of-words embeddings;

inputting the plurality of bag-of-words embeddings into a machine learning model to identify one or more electronic messages containing one or more transaction records, wherein the machine learning model is trained to identify bag-of-words embeddings containing one or more transaction records, and wherein each transaction record of the one or more transaction records comprises corresponding item identifiers;

transmitting, to a record identification server, a request to identify one or more server records associated with the one or more transaction records, wherein the request comprises the corresponding item identifiers, and wherein the record identification server uses the corresponding item identifiers to identify the one or more server records;

determining, based on one or more mutable parameters of the one or more server records, a value for a period of time during which a user is allowed to perform an action associated with the one or more server records;

receiving, from the record identification server, the one or more server records, wherein each server record of the one or more server records comprises corresponding parameters that correspond to a respective purchase record of a respective purchased item; and in response to determining that the corresponding parameters match one or more sets of a plurality of sets of criteria, generating a parameterized transaction record for the one or more transaction records, wherein the parameterized transaction record comprises the one or more transaction records and corresponding parameter data.

4. The method of claim 3, wherein generating the parameterized transaction record comprises:

retrieving a plurality of parameterized transaction record field identifiers;

retrieving values for a first portion of the plurality of parameterized transaction record field identifiers from the one or more transaction records;

in response to determining that values for a second portion of the plurality of parameterized transaction record field identifiers are not in the one or more transaction records, retrieving values for the second portion of the plurality of parameterized transaction record field identifiers from the one or more server records; and inserting, into the parameterized transaction record, the values of the first portion and second portion of the plurality of parameterized transaction record field identifiers.

5. The method of claim 3, further comprising:

receiving, from a remote server, an indication that no record matches a first transaction record of the one or more transaction records; and transmitting, to a user device, a second request for obtaining item data associated with the first transaction record of the one or more transaction records, wherein the second request comprises a plurality of data fields to be filled in by a user.

6. The method of claim 5, further comprising:

receiving, from the user device, the item data associated with the first transaction record of the one or more transaction records; and based on the item data matching a set of the plurality of sets of criteria, adding the first transaction record and the item data to the parameterized transaction record.

7. The method of claim 3, wherein determining that the corresponding parameters match one or more sets of the plurality of sets of criteria comprises:

selecting a first set of criteria of the plurality of sets of criteria, wherein the first set of criteria comprises a plurality of fields with a plurality of corresponding threshold values for evaluating a record;

determining a first subset of fields having values stored in the one or more transaction records and a second subset of fields having values stored in the one or more server records;

retrieving the values of the first subset of fields from the one or more transaction records and values of the second subset of fields from the one or more server records; and comparing the values to the plurality of corresponding threshold values to evaluate a record of the one or more transaction records.

8. The method of claim 3, further comprising:

receiving, from the record identification server, (1) the one or more server records associated with the one or more transaction records and (2) the corresponding parameters associated with the one or more server records;

determining, for each record of the one or more server records, one or more mutable parameters of the corresponding parameters;

generating, based on at least one value of the one or more mutable parameters, a message for a user, wherein the message causes a user device to display a prompt to perform an action related to an transaction record of the one or more transaction records; and transmitting the message to the user device.

9. The method of claim 8, wherein the method further comprises:

in response to determining that the value of the period of time is less than a first threshold period of time, generating one or more instructions for performing the action during the period of time.

10. The method of claim 9, further comprising:

receiving, from the user via a user interface, an input for performing the action;

transmitting, to a remote server, a command for performing the action; and in response to receiving an indication of a successful performance of the action, modifying at least one value of the one or more mutable parameters.

11. The method of claim 3, further comprising:

transmitting, to a remote server, a request for generating a component inventory, wherein the request comprises the parameterized transaction record;

receiving, from the remote server, a data file representing the component inventory; and generating for display on a user interface, (1) the data file and (2) a request for approving the data file.

12. The method of claim 11, further comprising:

receiving, via the user interface, an indication of approval for the data file; and transmitting, to the remote server, a notification of approval.

13. The method of claim 11, further comprising:

receiving, via the user interface, an indication that the data file is not approved; and generating for display on the user interface, (1) the data file and (2) one or more options for modifying the data file.

14. The method of claim 13, further comprising:

receiving, via the user interface, one or more selections for modifying the data file;

transmitting, to a remote server, a request to modify the data file based on the one or more selections;

receiving, from the remote server, a modified data file; and generating for display on a user interface, (1) the modified data file and (2) a request for approving the data file.

15. A non-transitory, computer-readable medium storing instructions that, when executed by one or more processors, cause the one or more processors to perform operations comprising:

receiving, a plurality of electronic messages associated with a user;

encoding the plurality of electronic messages into encoded vectors;

inputting the encoded vectors into a machine learning model to identify one or more electronic messages containing one or more transaction records, wherein the machine learning model is trained to identify encoded vectors containing one or more transaction records, and wherein each transaction record of the one or more transaction records comprises corresponding item identifiers;

transmitting, to a record identification server, a request to identify one or more server records associated with the one or more transaction records, wherein the request comprises the corresponding item identifiers, wherein the record identification server uses the corresponding item identifiers to identify the one or more server records, and wherein each server record corresponds to a transfer of an item associated with an item identifier;

receiving, from the record identification server, the one or more server records, wherein each server record of the one or more server records comprises corresponding parameters that correspond to a respective purchase record of a respective purchased item;

comparing, for each server record of the one or more server records, the corresponding parameters with a plurality of sets of criteria; and in response to determining that the corresponding parameters match one or more sets of the plurality of sets of criteria, generating a parameterized transaction record for the one or more server records, wherein the parameterized transaction record comprises the one or more transaction records and corresponding parameter data.

16. The non-transitory, computer-readable medium of claim 15, wherein generating the parameterized transaction record comprises:

retrieving a plurality of parameterized transaction record field identifiers;

retrieving values for a first portion of the plurality of parameterized transaction record field identifiers from the one or more transaction records;

in response to determining that values for a second portion of the plurality of parameterized transaction record field identifiers are not in the one or more transaction records, retrieving values for the second portion of the plurality of parameterized transaction record field identifiers from the one or more server records; and inserting, into the parameterized transaction record, the values of the first portion and second portion of the plurality of parameterized transaction record field identifiers.

17. The non-transitory, computer-readable medium of claim 15, wherein the instructions cause the one or more processors to perform operations comprising:

receiving, from a remote server, an indication that no record matches a first transaction record of the one or more transaction records; and transmitting, to a user device, a second request for obtaining item data associated with the first transaction record of the one or more transaction records, wherein the second request comprises a plurality of data fields to be filled in by a user.

18. The non-transitory, computer-readable medium of claim 17, wherein the instructions cause the one or more processors to perform operations comprising:

receiving, from the user device, the item data associated with the first transaction record of the one or more transaction records; and based on the item data matching a set of the plurality of sets of criteria, adding the first transaction record and the item data to the parameterized transaction record.

19. The non-transitory, computer-readable medium of claim 15, wherein determining that the corresponding parameters match one or more sets of a plurality of sets of criteria comprises:

selecting a first set of criteria of the plurality of sets of criteria, wherein the first set of criteria comprises a plurality of fields with a plurality of corresponding threshold values for evaluating a record;

determining a first subset of fields having values stored in the one or more transaction records and a second subset of fields having values stored in the one or more server records;

retrieving the values of the first subset of fields from the one or more transaction records and values of the second subset of fields from the one or more server records; and comparing the values to the plurality of corresponding threshold values to evaluate a record of the one or more transaction records.

20. The non-transitory, computer-readable medium of claim 15, wherein the instructions cause the one or more processors to perform operations comprising:

receiving, from the record identification server, (1) the one or more server records associated with the one or more transaction records and (2) the corresponding parameters associated with the one or more server records;

determining, for each record of the one or more server records, one or more mutable parameters of the corresponding parameters;

generating, based on at least one value of the one or more mutable parameters, a message for a user, wherein the message causes a user device to display a prompt to perform an action related to an transaction record of the one or more transaction records; and transmitting the message to the user device.

* * * * *